Aug. 17, 1926.

H. E. ZIPLINSKY

NUT LOCK

Filed August 7, 1925

1,596,136

Inventor

H.E. Ziplinsky

By Lacy & Lacy, Attorneys

Patented Aug. 17, 1926.

1,596,136

UNITED STATES PATENT OFFICE.

HENRY E. ZIPLINSKY, OF LANCASTER, PENNSYLVANIA.

NUT LOCK.

Application filed August 7, 1925. Serial No. 48,763.

This invention relates to a nut lock and one object of the invention is to provide an improved locking element which may be adjusted to securely hold the nut in place upon a threaded bolt and which may be released when the nut is to be removed.

Another object of the invention is to provide a latching pawl which may be readily inserted in a groove formed radially in the outer end of the nut and moved from an inoperative position to an operative position, the pawl when in the operative position being adapted to cut into the threads of the bolt shank and prevent rotation of the nut.

Another object of the invention is to so form the pawl that its cutting edge terminates at the pivoted end of the pawl in a tooth extension adapted to readily cut into a thread of a bolt.

This invention is illustrated in the accompanying drawing, wherein

Figure 1:
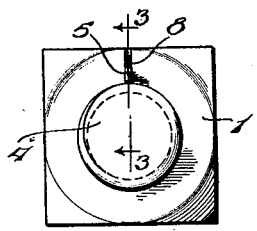
Figure 1 is a view in end elevation showing a nut applied to a bolt and secured by the improved locking means.
Figure 2:
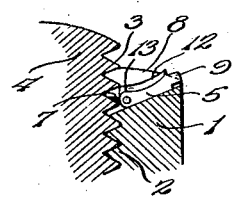
Fig. 2 is a fragmentary sectional view taken on the line A—A of Fig. 1 with the locking pawl shown in an inoperative position.
Figure 3:
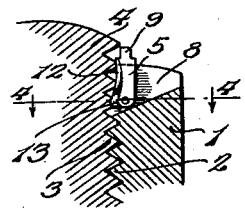
Fig. 3 is a view similar to Fig. 2 showing a locking pawl in an operative position.
Figure 5:
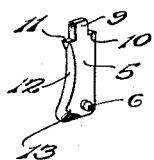
Fig. 5 is a perspective view of the locking pawl.
Figure 4:
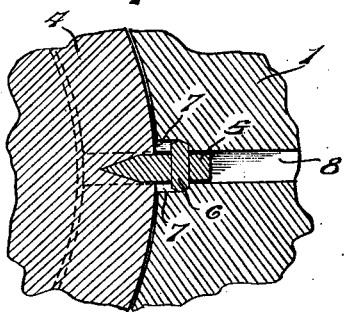
Fig. 4 is a transverse sectional view taken on the line 4—4 of Fig. 3.

The nut 1 is formed with an axially disposed bore having threads 2 to engage the threads 3 formed upon the bolt shank 4 when the nut is screwed upon the bolt shank in the usual manner. When a nut is first screwed upon the bolt and tightened, it serves to securely hold the bolt in place but if subjected to vibration the nut is liable to work loose. In order to prevent the nut from working loose, there has been provided a locking pawl 5 which is formed from tempered steel or other metal of sufficient hardness to cut into the threads of the bolt shank 4. This pawl is formed, as shown in Fig. 5, and adjacent one end carries a pin 6 which extends transversely through the pawl with its ends protruding a sufficient distance to fit into the recesses 7 formed in the side walls of the groove 8 which extends radially across the outer end face of the nut from the threaded bore to one side of the nut. The recesses 7 not only open into the groove 8 but also communicate with the bore of the nut so that the extended end portions of the pivot pin 6 which is slightly longer than the distance between the inner walls of the recesses may be driven into the recesses through their open ends to the position shown in Figure 4. By having the pin of such length that it has to be driven into place, the pawl is prevented from slipping out of place when the nut is off of the bolt. The groove 8 increases in depth towards its inner end so that, when the pawl is in an inoperative position, it will be supported at an incline, as shown in Fig. 2, with its reduced free end portion 9 extending slightly beyond the outer end face of the nut. The reduced end portion or lug extension 9 of the pawl can, therefore, be readily engaged in order to swing the pawl from the inoperative position shown in Fig. 2 to the operative position of Fig. 3. It should be further noted that reducing the free end portion of the pawl forms shoulders 10 and 11 against which a screw driver or other similar tool may be placed in order to easily drive the pawl into biting engagement with the threads of the bolt shank or force it out of a locking position. The side edge 12 of the pawl is sharpened and at this side the pawl has its pivoted end portion widened transversely to form a tapered tooth extension 13 which will readily cut into a thread of the bolt shank when the pawl is moved to the locking position. The pawl not only cuts into the thread engaged by the tooth extension 13 but also penetrates the teeth above it. It will, therefore, be seen that a plurality of the threads of the bolt shank are engaged by the pawl and the nut will be very securely held against turning.

When in use, the shank of the bolt is passed through the article which it is desired to secure and the nut screwed upon the bolt with the pawl disposed in the inoperative position. After the nut has been tightened the desired amount, the reduced free end of the pawl is engaged and the pawl swung towards the locking position. After the pawl has been swung outwardly a sufficient distance to move the tooth extension 13 into engagement with one of the teeth of the bolt, a screw driver blade or other similar implement is placed against the shoulder 10 and outer side edge face of the lug extension 9 and struck with a hammer or the reduced end of the pawl may be engaged by a pair of pliers having its jaws straddling the end of the bolt and the pawl forced to the locking position when pressure is applied to force the plier jaws towards each other. This causes the pawl to be snapped into the locking position shown in Fig. 3 with its tooth extension 13 and cutting edge 12 penetrating the threads of the bolt. The pawl will, therefore, serve to very effectively lock the bolt against turning in either direction and cannot be worked loose by vibration. When, however, it is desired to remove the nut or tighten it an additional amount, the blade of the screw driver is forced between the extended bolt end and inner side edge face of the lug extension 9 into engagement with the shoulder 11 and a prying action exerted to swing the pawl outwardly to the releasing position. The nut will then be released and can be either tightened or removed from the bolt in the usual manner.

Having thus described the invention, I claim:

A lock nut having a threaded bore adapted to receive the threaded shank of a bolt, said nut being provided with a groove extending radially across its outer end face from the bore to a side face of the nut, said groove having side walls and a bottom wall and increasing in depth towards its inner end and constituting a seat, recesses formed in the inner end portions of the side walls of said groove adjacent the bottom wall thereof, and a locking pawl disposed in said groove and adjacent its inner end provided with a pivot extending from its side faces and seated in said recesses to mount the pawl for swinging movement from a releasing to a locking position, the pawl when in a releasing position being disposed longitudinally in the groove and having its free end extending from the outer end face of the nut at the end of the groove and when in a locking position being disposed longitudinally of the nut with its free end portion extending beyond the outer end face of the nut, the said free end portion of the pawl being reduced in width to provide a reduced end and shoulders at the base of the reduced end for engagement by an actuating implement, said pawl having a concaved and sharpened longitudinal edge terminating at the pivoted end of the pawl in a sharpened tooth extension substantially triangular in shape, the sharpened edge and tooth being adapted to penetrate threads of a bolt received in the bore of the nut when the pawl is moved to a locking position.

In testimony whereof I affix my signature.

HENRY E. ZIPLINSKY. [L. S.]